(12) United States Patent
Lunner

(10) Patent No.: US 8,278,496 B2
(45) Date of Patent: Oct. 2, 2012

(54) METHOD IN CONNECTION WITH STEEL PRODUCTION

(75) Inventor: Sven-Eric Lunner, Avesta (SE)

(73) Assignee: Outokumpu Oyj, Espoo (FI)

( * ) Notice: Subject to any disclaimer, the term of this patent is extended or adjusted under 35 U.S.C. 154(b) by 932 days.

(21) Appl. No.: 12/299,899

(22) PCT Filed: May 7, 2007

(86) PCT No.: PCT/FI2007/000120
§ 371 (c)(1),
(2), (4) Date: Nov. 6, 2008

(87) PCT Pub. No.: WO2007/128864
PCT Pub. Date: Nov. 15, 2007

(65) Prior Publication Data
US 2009/0118565 A1    May 7, 2009

(30) Foreign Application Priority Data
May 10, 2006  (FI) ...................................... 20060460

(51) Int. Cl.
*A62D 3/36*      (2007.01)

(52) U.S. Cl. ........................................ 588/318; 588/410

(58) Field of Classification Search .................. 588/318, 588/313, 410, 414, 901
See application file for complete search history.

(56) References Cited

U.S. PATENT DOCUMENTS

| | | | | |
|---|---|---|---|---|
| 4,118,243 A | * | 10/1978 | Sandesara | 588/256 |
| 4,478,647 A | * | 10/1984 | Rones et al. | 134/13 |
| 6,174,383 B1 | * | 1/2001 | Angel et al. | 134/41 |
| 7,744,674 B2 | * | 6/2010 | Lunner et al. | 75/765 |

FOREIGN PATENT DOCUMENTS

| | | |
|---|---|---|
| JP | 57079107 A | 5/1982 |
| JP | 2000325969 A | 11/2000 |
| WO | 2005/098054 A1 | 10/2005 |

* cited by examiner

*Primary Examiner* — Edward Johnson
(74) *Attorney, Agent, or Firm* — Chernoff, Vilhauer, McClung & Stenzel LLP

(57) ABSTRACT

The invention relates to a method in connection with steel production for handling of hydroxide sludge formed in the neutralization of spent metal-contaminated pickling agents from a pickling step for steel, preferably stainless steel and for using calcium fluoride in the hydroxide sludge to replace the natural fluorspar as a fluxing agent in connection with steel production. Accordingly, the addition of the reactive neutralization medium is monitored by the pH electrodes operated in continuous fashion, and the pH value is adjusted at the range between 9.0 and 9.5.

8 Claims, No Drawings

METHOD IN CONNECTION WITH STEEL PRODUCTION

This is a national stage application filed under 35 USC 371based on International Application No. PCT/FI2007/000120 filed May 7, 2007, and claims priority under 35 USC 119 of Finnish Patent Application No. 20060460 filed May 10, 2006.

The present invention relates to a method of optimising the composition in a product that can be used as a fluxing agent in steel production, preferably in stainless steel production.

The production of steel, particularly stainless steel, comprises annealing and pickling stages. The annealing is a heat treatment that aims for recrystallisation of the microstructure of the steel and makes the steel ductile. In the annealing stage, an oxide layer is formed on the surface of the steel, and a chromium-depleted layer is formed directly beneath the oxide layer. Both of these two layers are removed by pickling.

In the pickling stage the annealed steel product is treated by acid, most often a mixture of different acids, by which the undesired metal deposits in the surface are taken away. A mixture of nitric acid, $HNO_3$, and hydrofluoric acid, HF, is the most efficient for pickling of stainless steel. The dissolved metals form metal complexes and deposits that have to be removed from the process. Especially, it is difficult to handle spent pickling liquids that contain mixed acids, such as a mixture of nitric acid and hydrofluoric acid, containing fluorides. Also the content of for instance iron, chromium and nickel oxides in the production of stainless steel constitutes a handling problem.

After pickling the steel product is flushed by water, whereby acidic flushing water is formed. The dissolved metals in the form of metal complexes and deposits, as well as acidic flushing water, constitute waste matters of several environmental impacts, and must be subjected to special handling in order not to cause several environmental damages. Similarly to the case in other process industries, there is also a target within the steel industry to recover waste products and to close the cycle.

The WO publication 2005/098054 describes a method in connection with steel production for handling of hydroxide sludge formed in the neutralization of spent metal-contaminated pickling agents from a pickling step for steel, preferably stainless steel. The neutralization of spent pickling liquid is performed to a pH of about 9-10, by addition of alkali, usually calcium hydroxide, $Ca(OH)_2$, but also other alkaline additives may be used, for instance calcium carbonate ($CaCO_3$), sodium hydroxide (NaOH). Prior to the neutralization chromium reduction of the liquid from the neolyte pickling step (pH 6-6,5) may take place. Regeneration of free acids in the pickling acids is performed and the reduction of nitrous fumes ($NO_x$) can be obtained by selective catalytic removal control or hydrogen peroxide treatment. After the neutralization, the neutralised pickling liquid is dewatered to a dry substance content of at least 30% by weight. This dewatered product is called hydroxide sludge, which contains among others calcium fluoride ($CaF_2$), calcium sulphate ($CaSO_4$) and iron, chromium and nickel hydroxides as well as calcium or iron molybdate at least in the case that hydrofluoric acid is used in the pickling liquid and in the case of stainless steel production. The hydroxide sludge is dried and calcined or sintered to a mechanical stable product so that the calcium fluoride in the hydroxide sludge can be used to replace the natural fluorspar as a fluxing agent in connection with steel production.

In the WO publication 2005/098054 it is further said that undertaken experiments of calcining of hydroxide sludge in a rotary kiln have shown to give a stable product. These experiments are not described further since the hydroxide sludge had exceptionally high moisture content of 55-60%, that resulted in abnormal problems during the calcining. One conclusion from the experiment was that the fines fraction of the hydroxide sludge is likely to be reduced, if the moisture content in the hydroxide sludge and the rotating speed of the rotary kiln are sufficiently low.

The object of the present invention is to eliminate some drawbacks of the prior art and to achieve an improved and optimised method of the handling of hydroxide sludge formed in the neutralization of spent metal-contaminated pickling agents from a pickling step for steel, preferably stainless steel in order to produce a stable product in a rotary kiln. The essential features of the present invention are enlisted in the appended claims.

The present invention is based on the method described in the referred WO publication 2005/098054 in order to optimise the composition of the hydroxide sludge as a slag former to a melt shop. In accordance with the present invention the neutralization of the spent pickling liquids from steel production, particularly from stainless steel production, is carried out in a controlled manner in order to have a stable product after the calcining and/or sintering process in a rotary kiln. Accordingly, in the neutralization of the spent pickling liquids it is utilized automatic pH measurement. The addition of the neutralization medium is monitored by the self-cleaning pH electrodes. The pH electrodes are operated in continuous fashion, and these pH electrodes adjust the pH value at the range between 9.0 and 9.5. This pH range is achieved by the addition of the reactive neutralizing medium of at most 5%, preferably at most 2% of the total mass of the spent pickling liquids to be neutralized.

The composition of the hydroxide sludge to be treated in the neutralization is strongly dependent on the production of different stainless steel grades, because different stainless steel grades have to be treated and pickled in different ways. Therefore, the pH measurement is done automatically and the addition of the neutralization medium is monitored in a continuous fashion. Further, an excess of the addition of neutralization medium is avoided to guarantee that essentially no extra of the neutralization medium is present in the hydroxide sludge to be neutralized.

The neutralization medium in the method of the invention is a calcium-containing compound, which has a good solubility with the mixture of the spent pickling liquids to be neutralized. The neutralization medium is preferably calcium hydroxide, $Ca(OH)_2$, having a good quality with a very good reactivity. This means that calcium hydroxide suitable for the method of the invention is essentially pure of common impurities, such as silicon dioxide ($SiO_2$). Another alternative for the neutralization medium is calcium carbonate, $CaCO_3$.

When using calcium hydroxide as a neutralization medium in accordance with the invention it is advantageous to adjust the moisture of the neutralization product, the hydroxide sludge, at the range of 45-50%. If the hydroxide sludge contains an excess in the moisture when comparing with this range advantageous for the further processing in the rotary kiln, the excess of moisture is eliminated in dewatering or in evaporation by heating the hydroxide sludge with hot air.

The hydroxide sludge having a preferable content of moisture is further processed in a rotary kiln at the temperature range of 950-1050° C. in order to achieve a well sintered and mechanically stable and dustless rotary kiln product. If desirable, the rotary kiln product is further processed in a briquetting machine at the presence of essentially carbon-free calcium fluoride powder, $CaF_2$, as a binding substance to give the desired strength for the briquettes. The rotary kiln product and/or the briquettes produced can be utilized as fluxing agent instead of or in combination with regular fluorspar, $CaF_2$, for instance in an AOD converter or in CLU converter for stainless steel production.

In accordance with the invention when using calcium hydroxide in the amount of at most 5%, preferably at most 2% of the total mass of the spent pickling liquids to be neutralized, it is noticed, that the following advantages are achieved in the hydroxide sludge to improve the quality of the final product after the treatment in the rotary kiln:

1. The calcium fluoride, $CaF_2$, concentration in the rotary kiln product can be kept at a level of 45-55% of the total mass of the rotary kiln product, which is favorable for a slag former.

2. The amount of fines (the particle size of the rotary kiln product lower than 2 mm) can be kept at a low level, preferably 25% of the total mass of the rotary kiln product.

3. The quality of the briquettes retains strong for a long time, sufficient for stocking and further processing for instance in an AOD converter or in a CLU converter. The addition of a binding substance such as calcium fluoride, $CaF_2$ powder is necessary to give the briquettes their required strength.

4. The concentration of harmful hexavalent chromium ($Cr^{6+}$) in the rotary kiln product can be kept at a level lower than 0.5% of the total mass of the rotary 10 kiln product.

The invention claimed is:

1. A method used in connection with production of steel, said method comprising:
   pickling the steel using an acidic pickling agent, whereby a spent, metal-contaminated pickling agent is formed,
   neutralizing and dewatering the spent pickling agent to form a hydroxide sludge,
   heating the hydroxide sludge to a temperature in the range from 950-1050° C. to produce a mechanically stable product,
   and wherein the step of neutralizing the spent pickling agent comprises monitoring pH of the pickling agent in continuous fashion and adding a reactive neutralization medium to the pickling agent to achieve a pH value in the range between 9.0 and 9.5.

2. A method according to claim 1, wherein the metal-contaminated pickling agent contains a fluoride compound and the neutralization medium comprises a calcium-containing compound, whereby the hydroxide sludge contains calcium fluoride.

3. A method according to claim 2, wherein the neutralization medium comprises calcium hydroxide or calcium carbonate.

4. A method according to claim 1, comprising dewatering the spent pickling agent so that the hydroxide sludge has a moisture content between 45-50%.

5. A method according to claim 1, comprising adding the neutralization medium in an amount of at most 5% of the total mass of the spent pickling agent to be neutralized.

6. A method according to claim 1, further comprising briquetting said mechanically stable product in the presence of substantially carbon-free calcium fluoride powder.

7. A method according to claim 1, wherein the step of heating the hydroxide sludge comprises calcining and sintering the hydroxide sludge in a rotary kiln and the method further comprises briquetting the calcined and sintered hydroxide sludge using essentially carbon-free calcium fluoride powder as a binding substance.

8. A method according to claim 1, wherein the step of neutralizing the spent pickling agent comprises monitoring pH of the pickling agent in continuous fashion using self-cleaning pH electrodes.

* * * * *